J. ECKART.
PRESERVING FLESH AND FISH BY SALICYLIC ACID.
No. 194,550. Patented Aug. 28, 1877.
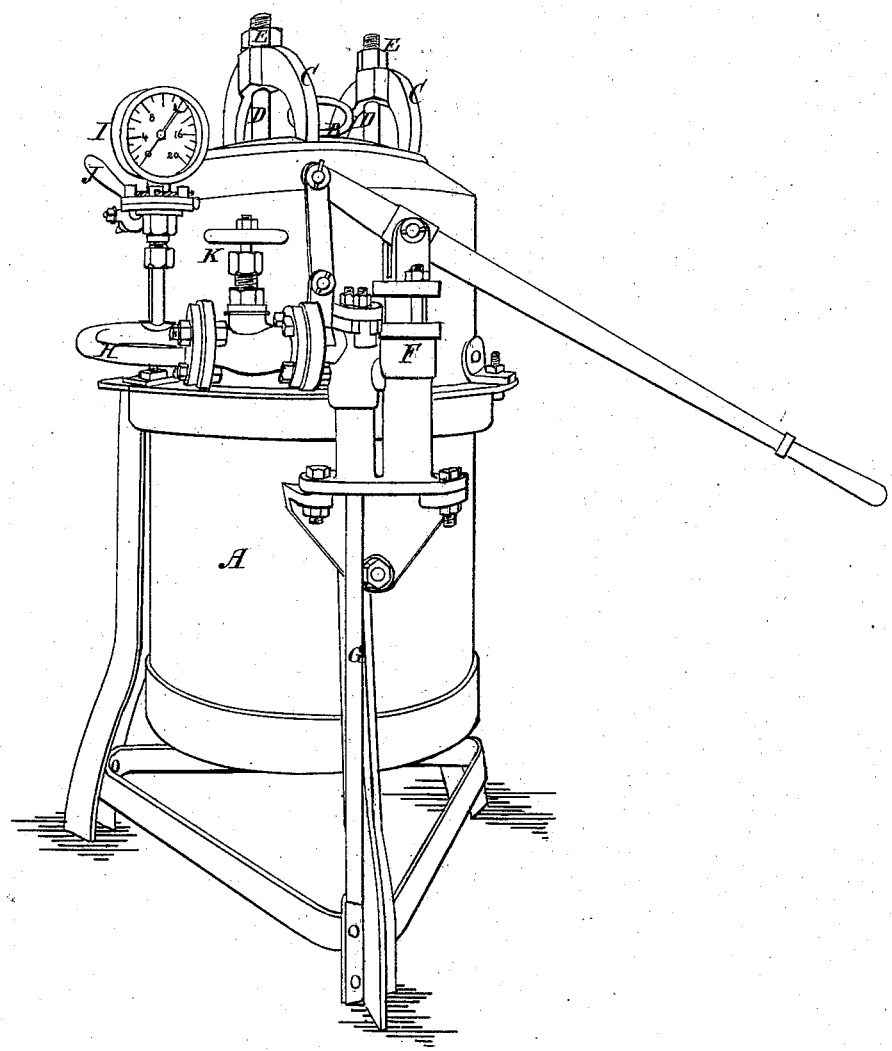

UNITED STATES PATENT OFFICE.

JOHR ECKART, OF MUNICH, GERMANY.

IMPROVEMENT IN PRESERVING FLESH AND FISH BY SALICYLIC ACID.

Specification forming part of Letters Patent No. 194,550, dated August 28, 1877; application filed June 11, 1877.

*To all whom it may concern:*

Be it known that I, JOHR ECKART, a citizen of Munich, Kingdom of Bavaria, German Empire, have invented a new and useful process for preserving fresh beef, fish, or other animal substances of a similar nature, which process is fully described in the following specification, reference being had to the accompanying drawing of the mechanism used in said process.

The principal feature of this invention is the rapid impregnation by hydraulic pressure of the animal matter with a solution of salicylic acid dissolved in water.

The apparatus which I use for carrying out my process is briefly described as follows, viz: I use a large iron or copper tank, (shown at A,) made very strong so as to resist a great pressure, and capable of being closed with a cover, B, water-tight. Connected with this tank is a force-pump, F, for forcing into it the impregnating solution, a pressure-gage, I, attached to the apparatus, indicating the amount of pressure accumulated by the force-pump. The exhaust-pipe G of the pump is connected with a vessel containing the impregnating solution. This solution is made by dissolving salicylic acid in water, the most desirable proportions being about half a pound of salicylic acid to one hundred pounds of water.

The cover of the tank being removed, the meat or animal matter is placed in the tank until it is nearly full. The remaining space is filled with the impregnating solution, and the cover securely replaced on the tank and fastened water-tight. The force-pump is then operated to force in additional quantities of the solution, or to exert a pressure upon the fluid already therein, until a sufficient pressure is indicated by the gage. I have found that a pressure equal to that of twelve atmospheres is a desirable pressure required for the most successful impregnation of most substances by this process. A short time only—with most meats only an hour or two—under this pressure is requisite to thoroughly impregnate the animal matter, and the preserved meats resulting from this process are equal in quality and superior in the power of resisting decay to meats cured or salted by the old process, which usually occupied weeks, or several days at least, in their salting and curing.

I do not claim, broadly, as my invention the discovery that salicylic acid is an antiseptic or preservative against decay; nor do I claim the process of curing meats by the use of salicylic acid with other chemicals to insure or to aid its introduction into the meat without pressure; but What I do claim, and desire to secure as my invention by Letters Patent, is—

The within-described process of preserving animal food by forcing into it, by hydraulic pressure, a preservative solution of salicylic acid in the water-tight vessel, substantially as described.

JOHR ECKART.

Witnesses:
CARL BRETZFELD,
LUDWIG KELLER.